US 8,345,745 B2

(12) United States Patent
Song et al.

(10) Patent No.: US 8,345,745 B2
(45) Date of Patent: *Jan. 1, 2013

(54) METHOD AND APPARATUS FOR ENCODING AND/OR DECODING MOVING PICTURES

(75) Inventors: Byung-cheol Song, Gyeonggi-do (KR); Kang-wook Chun, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1081 days.

This patent is subject to a terminal disclaimer.

(21) Appl. No.: 12/149,383

(22) Filed: Apr. 30, 2008

(65) Prior Publication Data

US 2008/0205528 A1    Aug. 28, 2008

Related U.S. Application Data

(63) Continuation of application No. 11/249,389, filed on Oct. 14, 2005, now Pat. No. 7,970,054, which is a continuation of application No. 10/755,671, filed on Jan. 13, 2004, now abandoned.

(30) Foreign Application Priority Data

Jan. 14, 2003 (KR) .................................. 2003-2371

(51) Int. Cl.
    *H04N 7/12*     (2006.01)
    *H04N 11/02*    (2006.01)
    *H04N 11/04*    (2006.01)

(52) U.S. Cl. .................................. 375/240.03

(58) Field of Classification Search .............. 375/240.03
    See application file for complete search history.

(56) References Cited

U.S. PATENT DOCUMENTS

| 5,214,507 | A | | 5/1993 | Aravind et al. |
| 5,500,678 | A | | 3/1996 | Puri |
| 5,565,921 | A | * | 10/1996 | Sasaki et al. ............. 375/240.13 |
| 5,610,729 | A | | 3/1997 | Nakajima |
| 5,737,022 | A | * | 4/1998 | Yamaguchi et al. ..... 375/240.15 |
| 5,737,481 | A | * | 4/1998 | Gushima et al. ............. 386/263 |
| 5,786,856 | A | * | 7/1998 | Hall et al. .................. 348/403.1 |
| 5,808,700 | A | | 9/1998 | Sugimoto et al. |
| 6,097,757 | A | * | 8/2000 | Boice et al. .................... 375/240 |
| 6,285,774 | B1 | | 9/2001 | Schumann |
| 6,421,386 | B1 | | 7/2002 | Chung et al. |
| 6,480,539 | B1 | | 11/2002 | Ramaswamy |

(Continued)

FOREIGN PATENT DOCUMENTS

EP    541 302 A2    5/1993

(Continued)

OTHER PUBLICATIONS

U.S. Office Action mailed Feb. 4, 2010 in related case U.S. Appl. No. 11/249,340.

(Continued)

*Primary Examiner* — Mehrdad Dastouri
*Assistant Examiner* — Jeremaiah Hallenbeck-Huber
(74) *Attorney, Agent, or Firm* — Staas & Halsey LLP

(57) ABSTRACT

A method of encoding moving pictures using a plurality of quantization matrices. The method involves selecting one of the plurality of quantization matrices in consideration of an at least one characteristics of an input image; transforming the input image; and quantizing the transformed input image using the selected quantization matrix.

17 Claims, 7 Drawing Sheets

U.S. PATENT DOCUMENTS

| | | | |
|---|---|---|---|
| 6,999,511 B1 * | 2/2006 | Boice et al. | 375/240 |
| 7,031,541 B2 | 4/2006 | Sakuyama | |
| 2004/0228406 A1 | 11/2004 | Song | |

FOREIGN PATENT DOCUMENTS

| | | |
|---|---|---|
| JP | 05-316364 | 11/1993 |
| JP | 06-165111 | 6/1994 |
| JP | 06-217278 | 8/1994 |
| JP | 07-075102 | 3/1995 |
| JP | 07-236137 | 9/1995 |
| JP | 10-243397 | 9/1998 |
| JP | 2000-324494 | 11/2000 |
| JP | 2001/204025 | 7/2001 |
| JP | 2001-313941 | 11/2001 |
| JP | 2002-044458 | 2/2002 |
| JP | 2002-247373 | 8/2002 |
| JP | 2003-009151 | 1/2003 |

OTHER PUBLICATIONS

U.S. Office Action mailed Feb. 4, 2010 in related case U.S. Appl. No. 11/249,312.
U.S. Final Office Action mailed Mar. 10, 2010 in related case U.S. Appl. No. 11/249,343.
U.S. Final Office Action mailed Mar. 17, 2010 in related case U.S. Appl. No. 11/249,389.
U.S. Final Office Action mailed Jun. 4, 2010 in related U.S. Appl. No. 11/249,374.
U.S. Final Office Action mailed Jun. 9, 2010 in related U.S. Appl. No. 11/249,312.
U.S. Final Office Action mailed Jun. 17, 2010 in related U.S. Appl. No. 11/249,340.
A. Ortega et al. "Forward-adaptive quantization with optimal overhead cost for image and video coding with applications to MPEG video coders," SPIE vol. 2419, pp. 129-138, Feb. 1995.
Chinese Office Action dated Apr. 11, 2008 in corresponding Chinese Patent Application No. 200510116143X.
U.S. Advisory Action mailed Jul. 13, 2010 in related U.S. Appl. No. 11/249,389.
U.S. Advisory Action mailed Jun. 29, 2010 in related U.S. Appl. No. 11/249,343.
U.S. Office Action mailed Sep. 15, 2010 in related U.S. Appl. No. 11/645,692.
U.S. Office Action mailed Nov. 9, 2010 in related U.S. Appl. No. 11/249,312.
U.S. Office Action mailed Nov. 10, 2010 in related U.S. Appl. No. 11/249,310.
U.S. Office Action mailed Nov. 9, 2010 in related U.S. Appl. No. 11/249,340.
U.S. Office Action mailed Dec. 16, 2010 in related U.S. Appl. No. 11/249,343.
W. Niehsen et al., Covariance Analysis of Motion-Compensated Frame Differences, IEEE Transactions on Circuits and Systems for Video Technology, vol. 9, No. 4, Jun. 1999, pp. 536-539.
Feng Pan, "Adaptive Image Compression Using Local Pattern Information", Pattern Recognition Letters 23 (2002), School of EEE, Centre for Signal Processing, Nanyang Technological University, 639798 Singapore, Singapore (pp. 1837-1845).
Anna N. Kim, et al., "Comparing Performance of Entropy Constrained Scalar Quantizer and Other Scalar Quantizers", Department of Telecommunications, NTNU, O.S. Bragstads plass 2B.N-7491 Trondheim, Norway (DSP 2002-1341—DPS 2002-1344).
Arturo A. Rodriguez, et al., "Digital Video Compression: Algorithms and Technologies 1995", The Society of Photo-Optical Instrumentation Engineers (SPIE), Proceedings, vol. 2419, San Jose, California, Feb. 7-10, 1995 (XP008030983).
Sung Deuk Kim, et al., "Efficient Block-Based Coding of Noise Images by Combining Pre-Filtering and DCT", Department of Electrical Engineering, Korea Advanced Institute of Science and Technology, 373-1, Kusongdong, Yusonggu, Taejon, Korea (pp. IV-37-IV-40), Jul. 1999.
ISO/IEC JTC 1/SC 29 N 659, "Coding of Audio, Picture, Multimedia and Hypermedia Information", Secretariat: Japan (JISC) XP 000567291, Dec. 1, 1993, pp. 45-64.
ISO/IEC 13818-2: 1995(E), Recommendation ITU-T H.262 (1995 E).
U.S. Appl. No. 10/755,671, filed Jan. 13, 2004, Byung-cheol Song et al., Samsung Electronics Co., Ltd.
U.S. Appl. No. 11/249,374, filed Oct. 14, 2005, Byung-cheol Song et al., Samsung Electronics Co., Ltd.
U.S. Appl. No. 11/249,312, filed Oct. 14, 2005, Byung-cheol Song et al., Samsung Electronics Co., Ltd.
U.S. Appl. No. 11/249,389, filed Oct. 14, 2005, Byung-cheol Song et al., Samsung Electronics Co., Ltd.
U.S. Appl. No. 11/249,310, filed Oct. 14, 2005, Byung-cheol Song et al., Samsung Electronics Co., Ltd.
U.S. Appl. No. 11/249,340, filed Oct. 14, 2005, Byung-cheol Song et al., Samsung Electronics Co., Ltd.
U.S. Appl. No. 11/249,343, filed Oct. 14, 2005, Byung-cheol Song et al., Samsung Electronics Co., Ltd.
U.S. Appl. No. 11/645,692, filed Dec. 27, 2006, Byung-cheol Song et al., Samsung Electronics Co., Ltd.
U.S. Appl. No. 12/149,380, filed Apr. 30, 2008, Byung-cheol Song et al., Samsung Electronics Co., Ltd.
U.S. Appl. No. 12/149,382, filed Apr. 30, 2008, Byung-cheol Song et al., Samsung Electronics Co., Ltd.
Communication and European Search Report dated Aug. 25, 2005 for Application No. EP 04 00 0659 (4 pages).
European Search Report for Application No. 05022940.0-2223, Dec. 21, 2005.
Notice to Submit Response issued by the Korean Intellectual Property Office for Application No. 10-2003-0002371 dated Dec. 15, 2005.
US Non-Final Office Action mailed Jun. 27, 2008 issued in related U.S. Appl. No. 11/249,310.
US Final Office Action mailed Mar. 9, 2009 issued in related U.S. Appl. No. 11/249,310.
US Advisory Action mailed May 27, 2009 issued in related U.S. Appl. No. 11/249,310.
US Non-Final Office Action mailed Jun. 23, 2009 issued in related U.S. Appl. No. 11/249,310.
US Non-Final Office Action mailed Jun. 27, 2008 issued in related U.S. Appl. No. 11/249,340.
US Final Office Action mailed Mar. 16, 2009 issued in related U.S. Appl. No. 11/249,340.
US Advisory Action mailed May 27, 2009 issued in related U.S. Appl. No. 11/249,340.
US Non-Final Office Action mailed Jun. 25, 2009 issued in related U.S. Appl. No. 11/249,340.
US Non-Final Office Action mailed Jun. 27, 2008 issued in related U.S. Appl. No. 11/249,389.
US Final Office Action mailed Feb. 19, 2009 issued in related U.S. Appl. No. 11/249,389.
US Advisory Action mailed May 14, 2009 issued in related U.S. Appl. No. 11/249,389.
US Non-Final Office Action mailed Aug. 18, 2009 issued in related U.S. Appl. No. 11/249,389.
US Non-Final Office Action mailed Jul. 21, 2008 issued in related U.S. Appl. No. 11/249,343.
US Final Office Action mailed Mar. 16, 2009 issued in related U.S. Appl. No. 11/249,343.
US Advisory Action mailed Jun. 26, 2009 issued in related U.S. Appl. No. 11/249,343.
US Non-Final Office Action mailed Aug. 20, 2009 issued in related U.S. Appl. No. 11/249,343.
US Non-Final Office Action mailed Jun. 25, 2008 issued in related U.S. Appl. No. 11/249,374.
US Final Office Action mailed Mar. 5, 2009 issued in related U.S. Appl. No. 11/249,374.
US Advisory Action mailed May 26, 2009 issued in related U.S. Appl. No. 11/249,374.
US Non-Final Office Action mailed Sep. 2, 2009 issued in related U.S. Appl. No. 11/249,374.

US Non-Final Office Action mailed Jun. 27, 2008 issued in related U.S. Appl. No. 11/249,312.
US Final Office Action mailed Mar. 9, 2009 issued in related U.S. Appl. No. 11/249,312.
US Advisory Action mailed May 27, 2009 issued in related U.S. Appl. No. 11/249,312.
US Non-Final Office Action mailed Jun. 25, 2009 issued in related U.S. Appl. No. 11/249,312.
US Non-Final Office Action mailed Feb. 8, 2008 issued in related U.S. Appl. No. 10/755,671.
US Final Office Action mailed Sep. 26, 2008 issued in related U.S. Appl. No. 10/755,671.
US Advisory Action mailed Dec. 15, 2008 issued in related U.S. Appl. No. 10/755,671.
US Notification of Abandonment mailed Apr. 27, 2009 issued in related U.S. Appl. No. 10/755,671.
Japanese Office Action dated Jan. 19, 2010 corresponds to Japanese Patent Application 2005-304891.
Japanese Office Action dated Jan. 19, 2010 corresponds to Japanese Patent Application 2005-304894.
Final U.S. Office Action mailed Jan. 22, 2010 in related case U.S. Appl. No. 11/249,310.
Interview Summary mailed Jan. 15, 2010 in related case U.S. Appl. No. 11/249,374.
U.S. Notice of Allowance mailed Mar. 2, 2011 in related U.S. Appl. No. 11/249,374.
U.S. Notice of Allowance mailed Feb. 18, 2011 in related U.S. Appl. No. 11/249,389.
U.S. Notice of Allowance mailed Mar. 22, 2011 in related U.S. Appl. No. 11/249,310.
U.S. Notice of Allowance mailed Mar. 4, 2011 in related U.S. Appl. No. 11/249,340.
U.S. Notice of Allowance mailed Mar. 15, 2011 in related U.S. Appl. No. 11/249,343.
U.S. Notice of Allowance mailed Mar. 22, 2011 in related U.S. Appl. No. 11/645,692.
Office Action dated Jun. 7, 2011 for related U.S. Appl. No. 12/149,380.
Notice of Allowance dated Jun. 9, 2011 for related U.S. Appl. No. 11/249,312.
Office Action dated Jun. 8, 2011 for related U.S. Appl. No. 12/149,382.
Chinese Reexamination Notification dated Mar. 26, 2012, corresponds to Chinese Patent Application No. 200510116146.3.
Chinese Reexamination Notification dated Mar. 27, 2012, corresponds to Chinese Patent Application No. 200510116148.2.
Chinese Reexamination Notification dated Mar. 30, 2012, corresponds to Chinese Patent Application No. 200510116147.8.
U.S. Advisory Action mailed May 17, 2012 in related U.S. Appl. No. 12/149,380.
U.S. Advisory Action mailed May 14, 2012 in related U.S. Appl. No. 12/149,382.
U.S. Final Office Action for co-pending U.S. Appl. No. 12/149,380; Mailed Feb. 22, 2012.
U.S. Final Office Action for co-pending U.S. Appl. No. 12/149,382; Mailed Feb. 23, 2012.
Chinese Office Action, Notification of Reexamination, dated Feb. 29, 2012 in corresponding Chinese Patent Application 200510116143.X.
European Communication Pursuant to Article 94(3) EPC dated Dec. 16, 2011 in corresponding European Patent Application No. 04 000 659.5-1247.
European Communication Pursuant to Article 94(3) EPC dated Dec. 16, 2011 in corresponding European Patent Application No. 05 022 938.4-1247.
European Communication Pursuant to Article 94(3) EPC dated Dec. 16, 2011 in corresponding European Patent Application No. 05 022 939.2-1247.
European Communication Pursuant to Article 94(3) EPC dated Dec. 16, 2011 in Corresponds to European Patent Application No. 05 022 940.0-1247.
European Communication Pursuant to Article 94(3) EPC dated Dec. 16, 2011 in corresponding European Patent Application No. 05 022 941.8-1247.
European Communication Pursuant to Article 94(3) EPC dated Dec. 16, 2011 in corresponding European Patent Application No. 05 022 942.6-1247.
European Communication Pursuant to Article 94(3) EPC dated Dec. 16, 2011 in corresponding European Patent Application No. 05 022 943.4-1247.
European Communication Pursuant to Article 94(3) EPC dated Dec. 16, 2011 in corresponding European Patent Application No. 06 026 627.7-1247.
European Communication Pursuant to Article 94(3) EPC dated Dec. 15, 2011 in corresponding European Patent Application No. 08 01 943.1-1247.
European Communication Pursuant to Article 94(3) EPC dated Dec. 15, 2011 in corresponding European Patent Application No. 08 011 944.9-1247.
European Communication Pursuant to Article 94(3) EPC dated Dec. 15, 2011 in corresponding European Patent Application No. 08 011 959.7-1247.
European Communication Pursuant to Article 94(3) EPC dated Dec. 15, 2011 in corresponding European Patent Application No. 08 013 188.1-1247.
European Communication Pursuant to Article 94(3) EPC dated Dec. 15, 2011 in corresponding European Patent Application No. 08 013 630.2-1247.
U.S. Notice of Allowance mailed Aug. 20, 2012 in related U.S. Appl. No. 12/149,380.
U.S. Notice of Allowance mailed Aug. 8, 2012 in related U.S. Appl. No. 12/149,382.
Communication mailed Sep. 11, 2012 in co-pending U.S. Appl. No. 12/149,382.
Notice of Allowance mailed Jun. 9, 2011 in co-pending U.S. Appl. No. 11/249,312.
Notice of Allowance mailed Aug. 20, 2012 in co-pending U.S. Appl. No. 12/149,380.

* cited by examiner

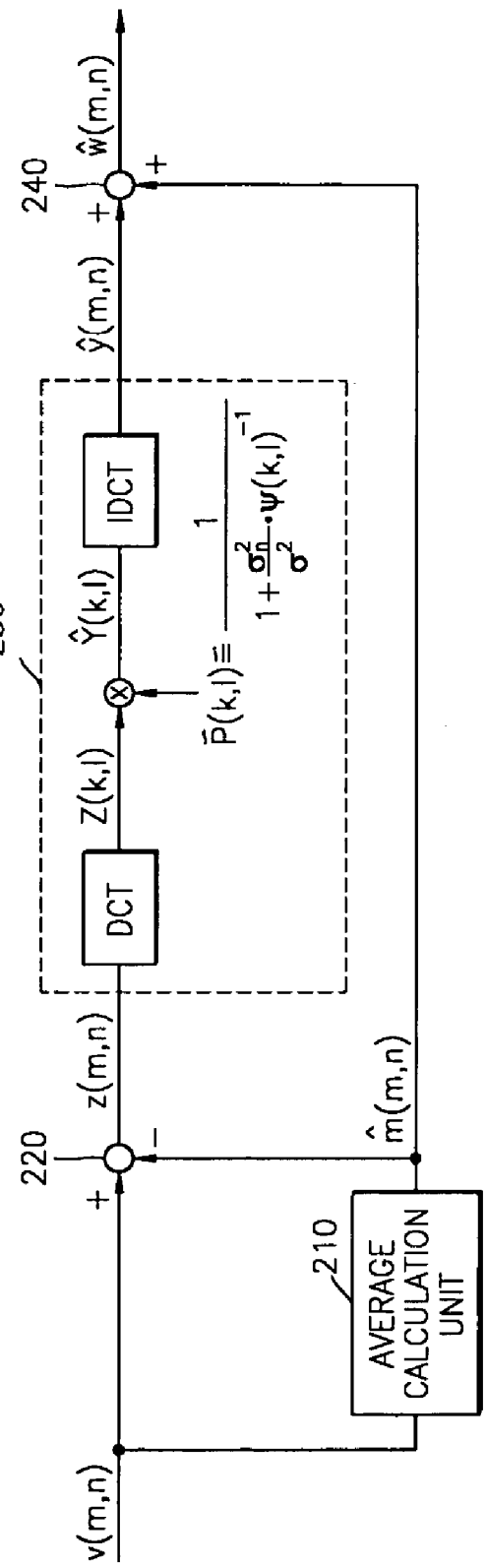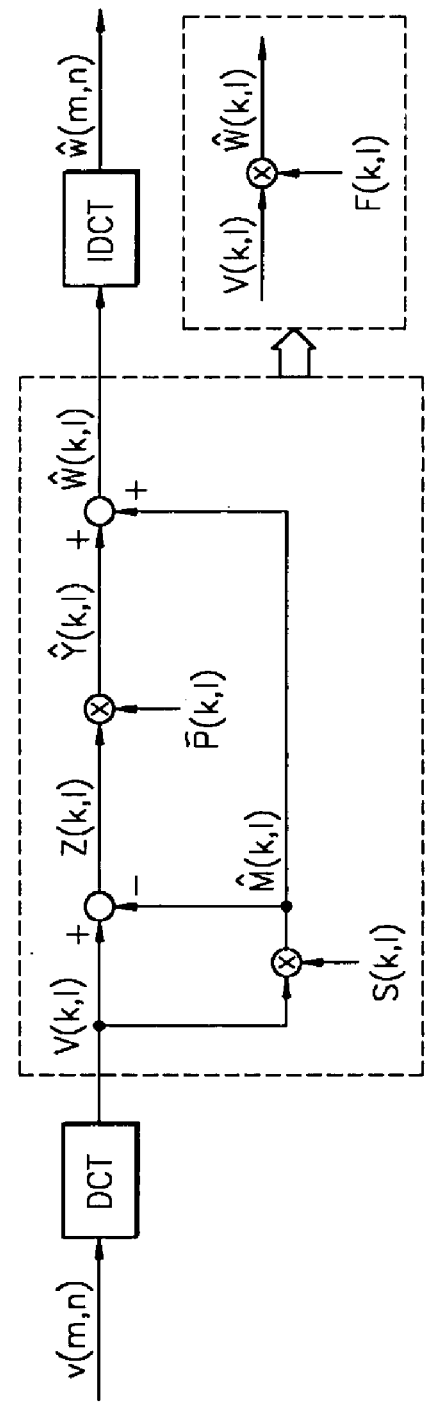

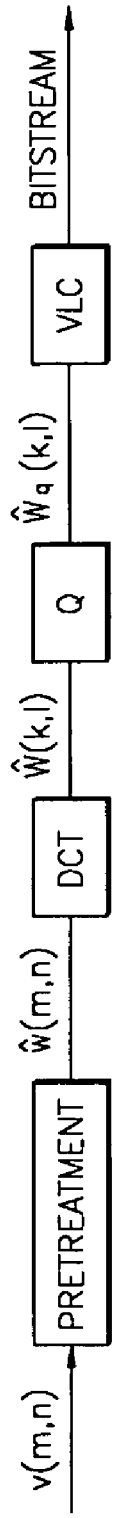
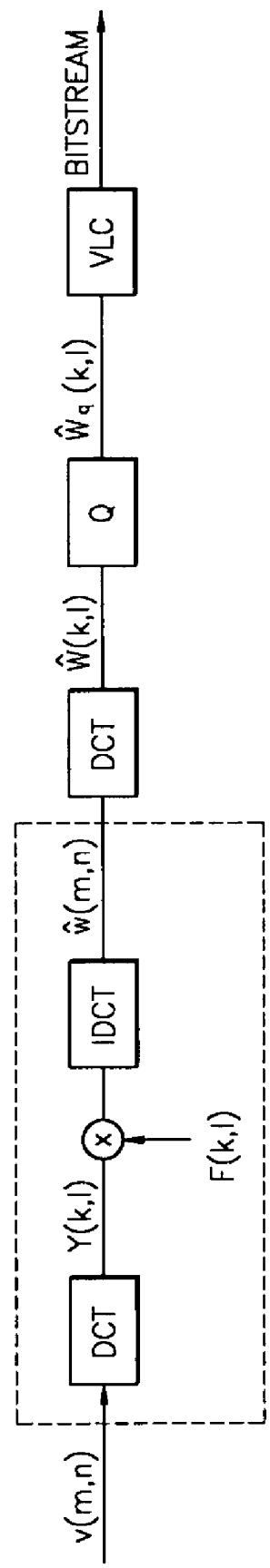
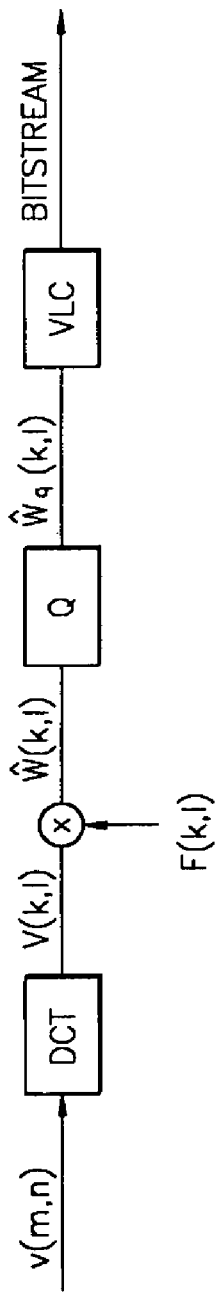
FIG. 4A
FIG. 4B
FIG. 4C

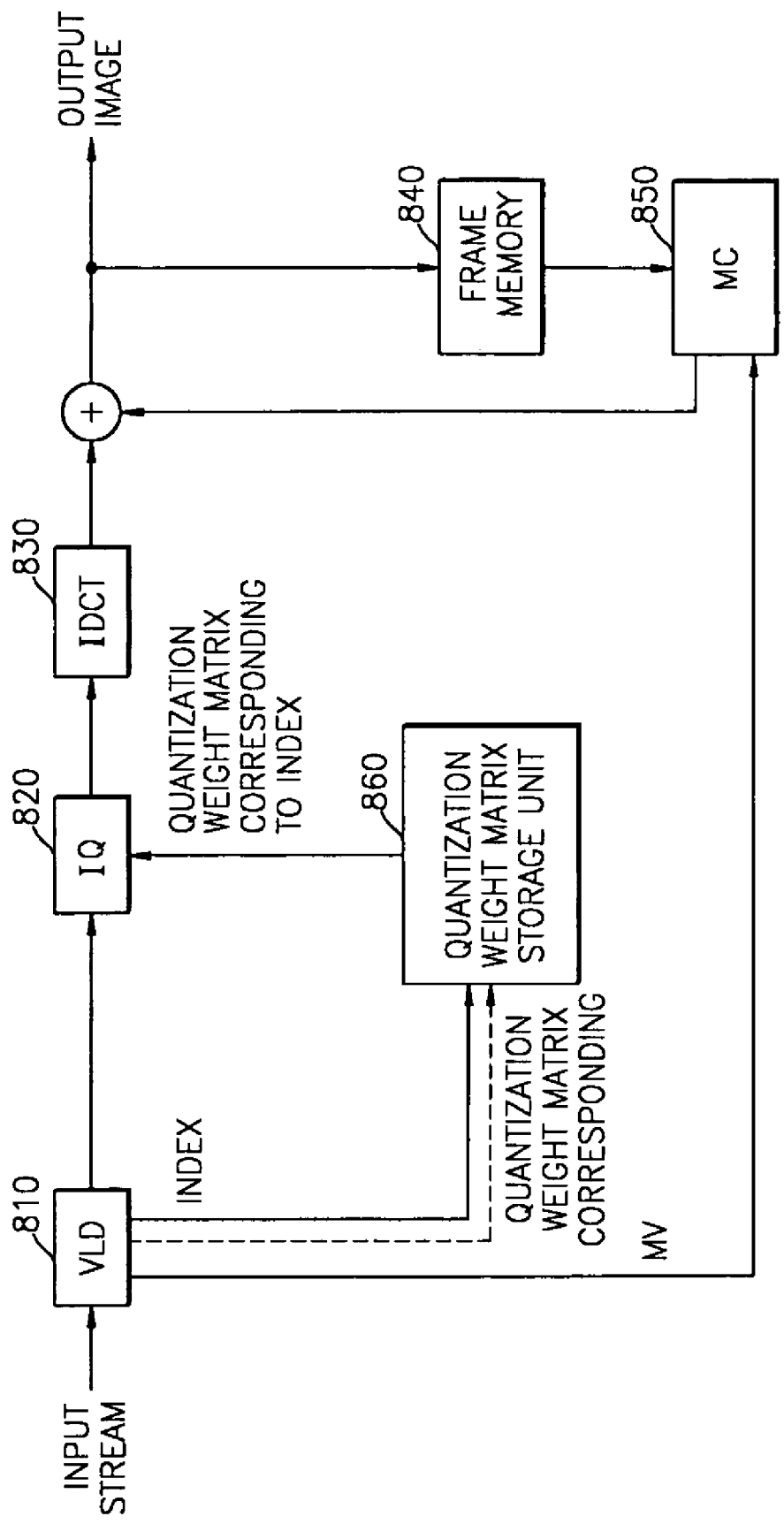

METHOD AND APPARATUS FOR ENCODING AND/OR DECODING MOVING PICTURES

CROSS-REFERENCE TO RELATED APPLICATIONS

This application is a continuation of application Ser. No. 11/249,389 filed on Oct. 14, 2005, which is a continuation of application Ser. No. 10/755,671 filed Jan. 13, 2004, which claims the priority of Korean Patent Application No. 2003-2371, filed on Jan. 14, 2003, in the Korean Intellectual Property Office, the disclosure of which is incorporated herein by reference.

BACKGROUND OF THE INVENTION

1. Field of the Invention

The present invention relates to a method and apparatus for encoding and/or decoding moving pictures, and more particularly, to a method and an apparatus for encoding and/or decoding moving pictures which are capable of enhancing the efficiency of encoding moving pictures by adaptively selecting a quantization matrix in consideration of the characteristics of images input into a moving picture encoder.

2. Description of the Related Art

FIG. 1 is a block diagram of an encoding unit 120 for encoding moving pictures and a decoding unit 140 for decoding encoded moving pictures.

In order to provide a video-on-demand (VOD) service or to enable a moving picture communication, the encoding unit 120 creates a bitstream encoded by a compression technique, and the decoding unit 140 restores original images from a bitstream input thereinto.

A discrete cosine transform (DCT) unit 122 carries out a DCT operation on image data input thereinto in the unit of an 8×8 pixel block in order to remove spatial correlation from the input image data. A quantization unit (Q) 124 carries out highly efficient data loss compression by carrying out quantization on the input image data using a DCT coefficient obtained by the DCT unit 122 and representing the quantized data by several representative values.

An inverse quantization unit (IQ) 126 inversely quantizes the quantized image data provided by the quantization unit 124. An inverse discrete cosine transform (IDCT) unit 128 carries out an IDCT on the inversely quantized image data provided by the inverse quantization unit 126. A frame memory unit 130 stores the IDCT'ed image data provided by the IDCT unit 128 on a frame-by-frame basis.

A motion estimation and compensation unit (ME/MC) 132 estimates a motion vector (MV) for each macroblock and a sum of absolute difference (SAD), which correspond to a block matching error, by using the image data of a current frame inputted thereinto and the image data of a previous frame stored in the frame memory unit 130.

A variable length coding unit (VLC) 134 removes statistical redundancy from digital cosine transformed and quantized image data according to the estimated motion vector provided by the motion estimation and compensation unit 132.

A bitstream encoded by the encoding unit 120 is decoded by the decoding unit 140. The decoding unit 140 includes a variable length decoding unit (VLD) 142, an inverse quantization unit 144, an IDCT unit 146, a frame memory unit 148, and a motion estimation unit 150.

U.S. Pat. No. 6,480,539 discloses an example of an apparatus for encoding moving pictures.

A set-top box, which receives an analog terrestrial broadcast program and then encodes and stores the received program by using a data compression method such as MPEG2 or MPEG4, has recently been developed. However, in the case of a terrestrial broadcast, images arriving at a receiving terminal may be distorted due to channel noise. For example, an image may look as if white Gaussian noise were added thereto. If the image is compressed as it is, the efficiency of compressing the image may be very low due to the influence of the white Gaussian noise.

Therefore, in order to get rid of noise in a conventional method of encoding moving pictures, a pretreatment filter is provided at an input port of an encoder. However, in the case of using the pretreatment filter, an additional calculation process for encoding moving pictures is needed.

In addition, in such a conventional method of encoding moving pictures, a quantization matrix is determined irrespective of the characteristics of an input image, and quantization is carried out on the input image by applying the quantization matrix to the input image on a picture-by-picture basis, in which case the efficiency of encoding the inputted image is low.

SUMMARY OF THE INVENTION

The present invention provides a method and an apparatus for encoding and/or decoding moving pictures, which are capable of improving the efficiency and performance of compressing moving pictures.

The present invention also provides a method and an apparatus for encoding and/or decoding moving pictures, which are capable of removing noise without increasing the number of calculations performed.

According to an aspect of the present invention, there is provided a method of encoding moving pictures using a plurality of quantization matrices. The method involves (a) selecting one of the plurality of quantization matrices in consideration of characteristics of an input image; (b) transforming the input image; and (c) quantizing the transformed input image using the selected quantization matrix.

According to another aspect of the present invention, there is provided a method of decoding moving pictures using a plurality of quantization matrices. The method involves (a) carrying out variable length decoding on encoded image data; (b) extracting index information that specifies one of the plurality of quantization matrices, classified according to characteristics of an input image, from the variable-length-decoded image data; (c) selecting one of the plurality of quantization matrices based on the extracted index information; and (d) inversely quantizing each macroblock of the variable-length-decoded image data using the selected quantization matrix.

According to another aspect of the present invention, there is provided an apparatus for encoding moving pictures using a plurality of quantization matrices. The apparatus includes a quantization matrix determination unit that selects one of the plurality of quantization matrices for each macroblock in consideration of characteristics of an input image and generates index information indicating the selected quantization matrix for each macro block; a quantization matrix storage unit that stores a plurality of quantization matrices, which are classified according to the characteristics of the input image and outputs a quantization matrix for each macroblock according to the index information generated by the quantization matrix determination unit; an image transformation unit that transforms the input image; and a quantization unit that quantizes the transformed input image using the selected quantization matrix.

According to another aspect of the present invention, there is provided an apparatus for decoding moving pictures using a plurality of quantization matrices. The apparatus includes a variable length decoding unit that receives an encoded image stream, carries out variable length decoding on the input image stream, and extracts index information that specifies one of the plurality of quantization matrices, which are classified according to characteristics of an input image, from each macroblock of the variable-length-decoded image stream; a quantization matrix storage unit that stores the plurality of quantization matrices, selects one of the plurality of quantization matrices based on the extracted index information, and outputs the selected quantization matrix; and an inverse quantization unit that inversely quantizes each macroblock of the variable-length-decoded image stream using the quantization matrix output from the quantization matrix storage unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and appreciated from the following description of the embodiments taken in the attached drawings in which:

FIG. 2 is a block diagram of an approximated generalized Wiener filter processing an image whose average is not 0;

FIG. 3 is a block diagram of an approximated generalized Wiener filter processing an image whose average is not 0 in a DCT block;

FIGS. 4A through 4C are block diagrams of different types of approximated generalized Wiener filters used for intra-block encoding;

FIG. 8 is a block diagram of an apparatus for decoding moving pictures according to an embodiment of the present invention.

DETAILED DESCRIPTION OF THE PREFERRED EMBODIMENTS

Figure 1:
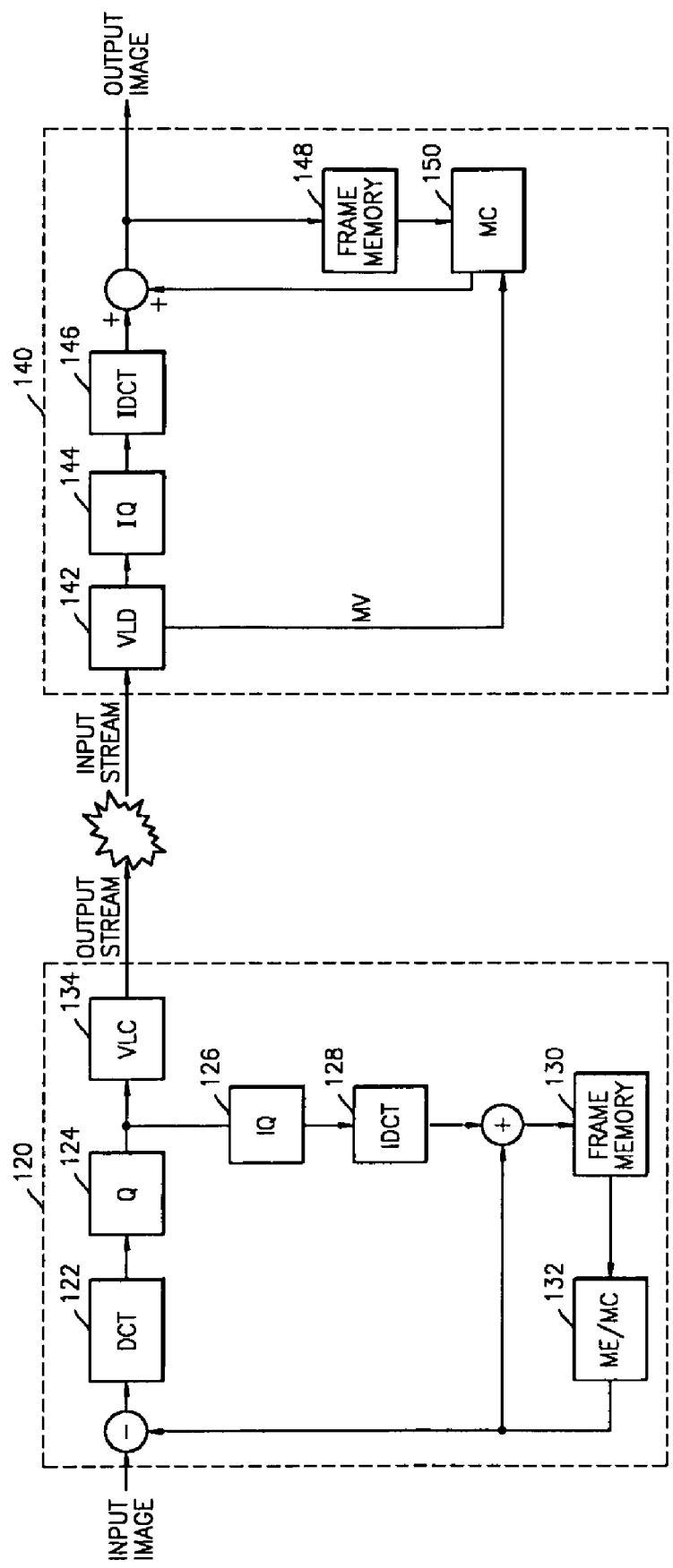
FIG. 1 is a block diagram of a conventional MPEG encoder and a conventional MPEG decoder.

Reference will now be made in detail to the embodiments of the present invention, examples of which are illustrated in the accompanying drawings, wherein like reference numerals refer to the like elements throughout. The embodiments are described below to explain the present invention by referring to the figures.

When it comes to encoding moving pictures, pre-treatment filtering is very important because it can increase the efficiency of encoding the moving pictures by removing noise from images. While a conventional pre-treatment filtering technique for removing noise from images is generally carried out in a spatial pixel block, in the present invention, a noise removal technique is carried out in a DCT block in an apparatus for encoding moving pictures.

In the present invention, an approximated generalized Weiner filtering method is used for removing noise from images. In the approximated generalized Weiner filtering method, Weiner filtering is realized by taking advantage of fast unitary transformation, such as a discrete cosine transform (DCT). However, a filtering method other than the approximated generalized Weiner filtering method may be selectively used for carrying out filtering in a DCT block.

FIG. 2 is a block diagram of an approximated generalized Weiner filter processing image data whose average is not 0.

In FIG. 2, v represents an image block containing noise, and $\hat{w}$ represents a row-ordered column vector of a filtered image block. Since the average of the image block v is not 0, an average estimation unit 210 estimates an average $\hat{m}$ of the image block v, and a subtraction unit 220 subtracts the estimated average $\hat{m}$ from the image block v.

A value z, output from the subtraction unit 220 as a result of the subtraction, is filtered by a filtering unit 230, and the filtering unit 230 outputs filtered data $\hat{y}$ as a result of the filtering. An addition unit 240 adds the estimated average $\hat{m}$ of the image block v to the filtered data and then outputs desirably filtered data $\hat{w}$ as a result of the addition.

Hereinafter, an approximated generalized Weiner filtering method for processing an image model whose average is 0 will be described in greater detail.

The approximated generalized Weiner filtering method for processing an image model whose average is 0 can be expressed by Equation (1) below.

$$\hat{y} = A^{*T}[ALA^{*T}]Az = A^{*T}\tilde{L}Z \quad (1)$$

In Equation (1), $\tilde{L} = AL\,A^{*T}$, $L = [I + \sigma_n^2 R^{-1}]^{-1}$, $R = E[y\,y^T]$, $Z = Az$, and $\sigma_n^2$ represents a noise variance value. In addition, in Equation (1), A represents unitary transformation. Since in the present embodiment, DCT is used as unitary transformation, A represents DCT here. Supposing that $C_8$ and $\otimes$ represent an 8×8 DCT matrix and a Kronecker operator, $A = C_8 \otimes C_8$.

Since, in most cases, $\tilde{L}$ is approximately diagonalized in a unitary transformation, Equation (1) can be rearranged into Equation (2) below.

$$\hat{y} = A^{*T} \quad (2)$$

In Equation (2), $\hat{Y} = \tilde{L}Z \approx [\text{Diag}\tilde{L}]Z$.

Therefore, by applying Equation (2) to an 8×8 block, Equation (3) below can be obtained.

$$\hat{y}(k, l) \approx \hat{p}(k, l) Z(k, l) \quad (3)$$

$$\hat{p}(k, l) \cong \frac{1}{1 + \frac{\sigma_n^2}{\sigma^2}\Psi(k, l)^{-1}} \quad (4)$$

In Equation (4), $\Psi(k, l)$ represents normalized elements placed along a diagonal line of $AL\,A^{*T}$, and $\sigma^2$ represents a variance value of an original image y. In general, $\sigma^2$ cannot be known. Therefore, $\sigma^2$ is substituted by a result of subtracting the noise variance value $\sigma_n^2$ from a variance value of z.

As shown in Equation (3), approximated generalized Weiner filtering is carried out on an image block whose average is 0 by multiplying a two-dimensional DCT coefficient $Z(k, l)$ by $\hat{p}(k, l)$. Once $\hat{y}(m, n)$ is determined, a final, filtered image is obtained by adding $\hat{m}(m, n)$ to $\hat{y}(m, n)$.

Hereinafter, an approximated generalized Weiner filtering method for processing an image model whose average is not 0 will be described in greater detail.

Let us assume that an average block is obtained by multiplying an input DCT block containing noise by S(k, l), i.e., the average block satisfied in Equation (5) below. Then, the approximated generalized Weiner filter method of FIG. 3, which carries out addition and subtraction in the DCT block, can be restructured into an approximated generalized Weiner filter of FIG. 4A, 4B, or 4C.

$$\hat{M}(k,l) = S(k,l) \cdot V(k,l) \tag{5}$$

By using Equations (3) and (5), an image block filtered in the DCT block can be represented by Equation (6) below.

$$\begin{aligned} \tilde{W}(k,l) &= \tilde{Y}(k,l) + \hat{M}(k,l) \\ &= (\tilde{p}(k,l) \cdot (1 - S(k,l)) + S(k,l)) \cdot V(k,l) \\ &= F(k,l) \cdot V(k,l) \end{aligned} \tag{6}$$

F(k, l) in Equation (6) can be expressed by Equation (7) below.

$$F(k,l) = \tilde{p}(k,l) \cdot (1 - S(k,l)) + S(k,l) \tag{7}$$
$$= \frac{1 + S(k,l) \cdot \frac{\sigma_n^2}{\sigma^2} \cdot \frac{1}{\Psi(k,l)}}{1 + \frac{\sigma_n^2}{\sigma^2} \cdot \frac{1}{\Psi(k,l)}}$$

As shown in Equation (6), the entire filtering process can be simplified into a multiplication of F(k, l). Equation (7) shows that F(k, l) is determined by a signal-to-noise ratio (SNR), a covariance matrix, and an average matrix.

In order to determine F(k, l), it is necessary to obtain an average matrix S(k, l). In the present embodiment, among possible candidates for the average matrix S(k, l), the one that is satisfied in Equation (5) is selected. The average matrix S(k, l) can be represented by Equation (8) below. Equation (8) illustrates one of the simplest forms that the average matrix S(k, l) could take in the DCT block.

$$S(k,l) = \begin{pmatrix} 1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{pmatrix} \tag{8}$$

Hereinafter, a pretreatment process performed in an apparatus for encoding moving pictures will be described in greater detail with reference to FIGS. 4 and 5.

As described above, an approximated generalized Weiner filtering process can be carried out on an image block whose average is not 0 by multiplying the image block with a DCT value.

FIGS. 4A through 4C are block diagrams of different types of approximated generalized Weiner filters in an apparatus for encoding moving pictures. More specifically, FIGS. 4A through 4C illustrate the structure of an encoding apparatus that processes an intra block. FIGS. 4A and 4B describe that an intra block is encoded by carrying out filtering on the intra block in a DCT block and carrying out quantization and variable length coding (VLC) on the filtered intra block without performing an inverse DCT on the filtered intra block. In other words, FIGS. 4A and 4B describe that filtering is completed by multiplying the DCT coefficient by F(k, l). In the meantime, quantization is carried out by multiplying or dividing the DCT coefficient by a certain value with reference to a quantization table. The filtering carried out by multiplying the DCT coefficient by F(k, l) and the quantization carried out by multiplying the DCT coefficient by a certain value can be integrated into a single operation, as described in FIG. 4C.

Figure 5:
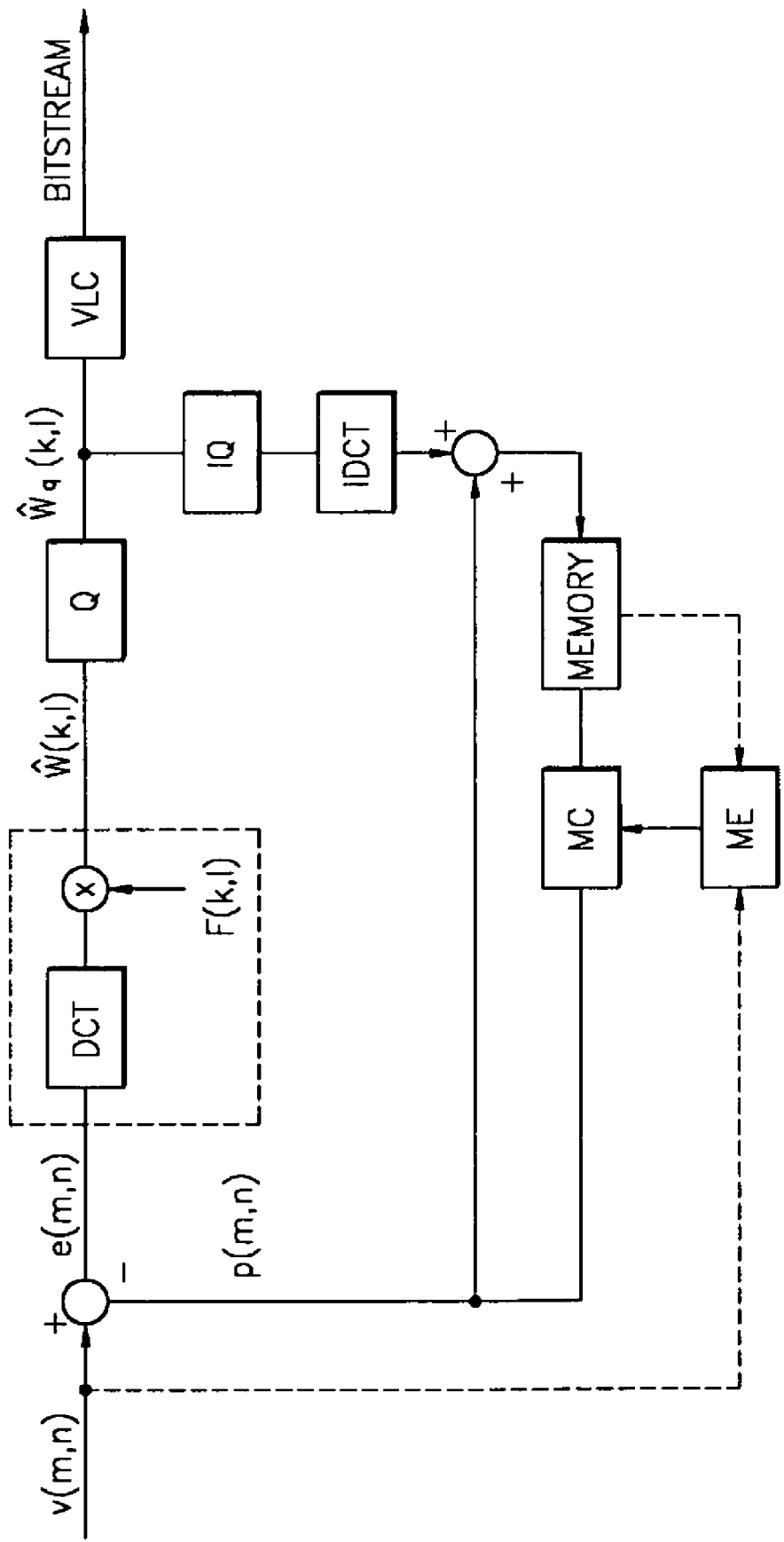
FIG. 5 is a block diagram of a typical video encoder used for inter-block encoding.

As described in FIG. 5, the concepts of the present invention, described in FIGS. 4A through 4C, can be directly applied to an occasion when an apparatus for encoding moving pictures processes an inter block, as long as the noise has been removed from the motion-compensated block information p(m, n).

A covariance value Ψ(k, l) is determined depending on whether an input image block is an inter block or an intra block. Therefore, F(k, l) of FIG. 5 may be varied depending on whether the input image block is an inter block or an intra block.

Hereinafter, a method of obtaining an estimated variance value of intra blocks or inter blocks, from each of which their average is subtracted, will be described in detail with reference to Equation (9) below. Supposing that S represents an N×N (where N=8) block from which an average of the corresponding block has already been subtracted, a variance matrix of the N×N block can be obtained using Equation (9).

$$\hat{C} = \frac{1}{2} \frac{N}{2\mathrm{trace}(S^T S)} (S^T S + S S^T) \tag{9}$$

Equation (9) has been disclosed by W. Niehsen and M. Brunig in "Covariance Analysis of Motion-compensated Frame Differences", IEEE Trans. Circ. Syst. for Video Technol., June 1999.

An estimated variance value can be obtained by applying Equation (9) to a variety of experimental images. Where an original image block is an intra block, an original image is divided into 8×8 blocks, and then a variance value of each of the 8×8 blocks is calculated. On the other hand, where the original image block is an inter block, an estimated variance value is calculated by applying Equation (9) above to each image block that is determined as an inter block.

By using the estimated covariance value, the following equation is obtained: $R = E[y \, y^T]$. Thereafter, by carrying out DCT on R, the following equation is obtained: $\Psi = ARA^{*T}$.

Hereinafter, a method of calculating $$\frac{\sigma_n^2}{\sigma^2}$$

of Equation (7) will be described.

In Equation (7), the noise variance value $\sigma_n^2$ can be obtained by using a noise estimator. Given that noise and original image pixels are independent random variables, an estimated value $\hat{\sigma}^2$ of the variance $\sigma^2$ of an original image can be calculated using Equation (10) below.

$$\hat{\sigma}^2 = \max(\hat{\sigma}_z^2 - \hat{\sigma}_n^2, 0) \tag{10}$$

In Equation (10), $\sigma_z^2$ represents a variance value of each macroblock (MB). In a typical type of apparatus for encoding moving pictures, $\sigma_z^2$ is calculated on a macroblock-by-macroblock basis. In the present embodiment, 8×8 blocks in the same macroblock are supposed to have the same variance value. Therefore, there is no need to perform additional calculations to obtain a variance value of each of the 8×8 blocks.

Figure 6:
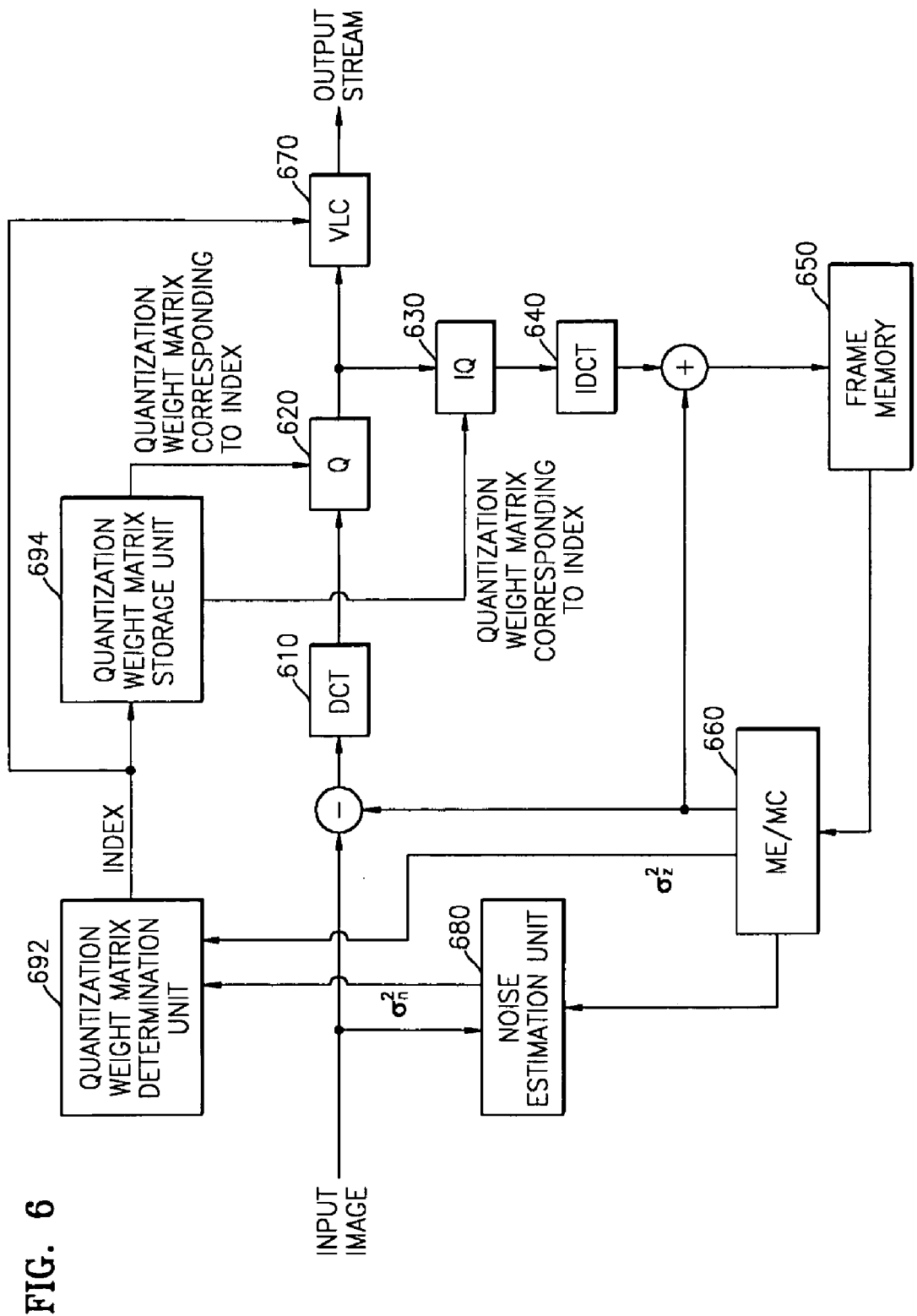
FIG. 6 is a block diagram of an apparatus for encoding moving pictures according to an embodiment of the present invention.

FIG. 6 is a block diagram of an apparatus for encoding moving pictures according to an embodiment of the present invention that encodes an input image in consideration of the characteristics of the input image.

In the present embodiment a level of noise contained in the input image is adaptively reflected in a quantization matrix.

Hereinafter, the structure and operation of the apparatus for encoding moving pictures according to a preferred embodiment of the present invention will be described in detail with reference to FIGS. 1 through 6.

The apparatus of FIG. 6 includes a discrete cosine transfer unit 610, a quantization unit (Q) 620, a variable length coding unit (VLC) 670, an inverse quantization unit (IQ) 630, an inverse DCT unit (IDCT) 640, a frame memory unit 650, and a motion estimation and compensation unit 660, which correspond to the DCT unit 122, the quantization unit 124, the VLC unit 134, the inverse quantization unit 126, the inverse DCT unit 128, the frame memory 130, and the motion estimation and compensation unit 132, respectively, of the encoding unit 120 of FIG. 1. In addition, the apparatus further includes a noise estimation unit 680, a quantization weight matrix determination unit 692, and a quantization weight matrix storage unit 694.

Since the DCT unit 610, the inverse DCT unit 640, the frame memory unit 650, and the motion estimation and compensation unit 660 serve the same functions as their respective counterparts of FIG. 1, their description will not be repeated.

The quantization weight matrix determination unit 692 determines a quantization weight matrix corresponding to a predetermined macroblock based on a noise variance value $\sigma_n^2$ received from the noise estimation unit 680 and the predetermined macroblock's variance value $\sigma_z^2$ received from the motion estimation and compensation unit 660. Thereafter, the quantization weight matrix determination unit 692 sends index information corresponding to the determined quantization weight matrix to the quantization weight matrix storage unit 694 and the VLC unit 670.

Hereinafter, a method of determining a quantization weight matrix corresponding to the predetermined macroblock based on $\sigma_n^2$ received from the noise estimation unit 680 and $\sigma_z^2$ received from the motion estimation and compensation unit 660, will be described in detail.

As described above with reference to Equation (8) and FIGS. 4 and 5, F(k, l) is determined by Equation (7). Once F(k, l) is determined, the DCT coefficient V(k, l) of an 8×8 block is multiplied by F(k, l), and the result of the multiplication $\hat{W}(k, l)$ is divided by a predetermined quantization weight matrix during a quantization process.

The apparatus of FIG. 6 integrates the process of multiplying F(k, l) by the DCT coefficient V(k, l) and the process of dividing $\hat{W}(k, l)$ by the quantization weight matrix into a single process and performs the single process. In other words, if a location component of (k, I of a quantization weight matrix QT is represented by Q(k, l), then a location of (k, l) in a new quantization weight matrix QT' is Q(k, l)/F(k, l).

In the present embodiment, by integrating the two separate processes into a single process, a plurality of F matrices obtained using $\sigma_n^2$ and $\sigma_z^2$ are computed in advance, and then the new quantization weight matrix QT' is then computed using the plurality of F matrices and then is stored in the quantization weight matrix storage unit 694.

In addition, in the present embodiment, five new quantization weight matrices obtained using $\sigma_n^2$ and $\sigma_z^2$ are stored in the quantization weight matrix storage unit 694. Once $\sigma_n^2$ and $\sigma_z^2$ are determined, $$\frac{\sigma_n^2}{\sigma^2}$$

can be calculated using Equation (10).

As shown in Equation (7), F(k, l) is determined by S(k, l), $\Psi(k, l)$, and $$\frac{\sigma_n^2}{\sigma^2}.$$

S(k, l) is calculated using Equation (8), and $\Psi(k, l)$ is variably set depending on whether or not an input image is an inter block or an intra block. Therefore, there is only one variable left for determining F(k, l), i.e., $$\frac{\sigma_n^2}{\sigma^2}.$$

In the present embodiments, five different estimates of $$\frac{\sigma_n^2}{\sigma^2}$$

and their respective quantization weight matrices QT' are provided. The provided quantization weight matrices QT' are stored in the quantization weight matrix storage unit 694.

The quantization weight matrix determination unit 692 quantizes $$\frac{\sigma_n^2}{\sigma^2}$$

based on $\sigma_n^2$ received from the noise estimation unit 680 and $\sigma_z^2$ received from the motion estimation and compensation unit 660. The result of the quantization is transmitted to the quantization weight matrix storage unit 692 and the VLC unit 670 as index information of a quantization matrix corresponding to the predetermined macroblock.

For example, if quantization weight matrices stored in the quantization weight matrix storage unit 694 are classified into five different types according to $$\frac{\sigma_n^2}{\sigma^2},$$

the quantization of $$\frac{\sigma_n^2}{\sigma^2}$$

is carried out in five levels, and the index information of each of the five quantization weight matrices is set to 0, 1, 2, 3, or 4.

In an image with a lot of noise, the $$\frac{\sigma_n^2}{\sigma^2},$$

especially for blocks having a small variance value, is very large. When $$\frac{\sigma_n^2}{\sigma^2}$$

is very large, F(k, l) approaches 0, resulting in a severe blocking phenomenon. In order to prevent the blocking phenomenon, $T_{cutoff}$ is used, as shown in Equation (11) below.

$$\frac{\sigma_n^2}{\sigma^2} = \min\left(T_{cutoff}, \frac{\sigma_n^2}{\sigma^2}\right) \tag{11}$$

In general, $T_{cutoff}$ has a value between 1 and 2.

The quantization weight matrix storage unit 694 transmits a quantization weight matrix corresponding to the index information received from the quantization weight matrix determination unit 692 to the quantization unit 620 and the inverse quantization unit 630.

The quantization unit 620 quantizes the predetermined macroblock using the quantization weight matrix received from the quantization weight matrix storage unit 694.

The inverse quantization unit 630 inversely quantizes the predetermined macroblock using the received quantization weight value.

The VLC unit 670 carries out VLC on input image data quantized by the quantization unit 620 and inserts the index information of the quantization weight matrix received from the quantization weight matrix determination unit 692 into a macroblock header.

In the present embodiment, the index information of the corresponding quantization weight matrix is inserted into the macroblock header and the macroblock header is transmitted. If there are ten quantization weight matrices stored in the quantization weight matrix storage unit 694, then 4-bit data is required for each macroblock.

Adjacent macroblocks are supposed to have similar image characteristics and there is supposedly a correlation among their index values. Therefore, a difference between an index value of one macroblock and an index value of an adjacent macroblock may be used as index information. The amount of index information to be transmitted can be considerably reduced in cases where a single quantization weight matrix is applied to an entire sequence.

In the present embodiment, a plurality of quantization weight matrices stored in the quantization weight matrix storage unit 694 should also be stored in a decoding unit. It may also be possible to use a plurality of quantization weight matrices transmitted to the decoding unit on a picture-by-picture basis using a picture extension header or transmitted to the decoding unit on a sequence-by-sequence basis using a sequence extension header.

As described above, it is possible to remove noise from an input image and enhance the efficiency of encoding the input image by adaptively applying a quantization matrix to each macroblock in consideration of a level of noise contained in the input image.

It is also possible for a user to arbitrarily determine quantization weight matrices. In the present embodiment, noise removal has been described as being performed on a Y component of an input image block in a DCT block. However, the noise removal can also be applied to a U or V component of the input image block, in which case additional quantization weight matrices are required exclusively for the U and V components of the input image block.

Figure 7:
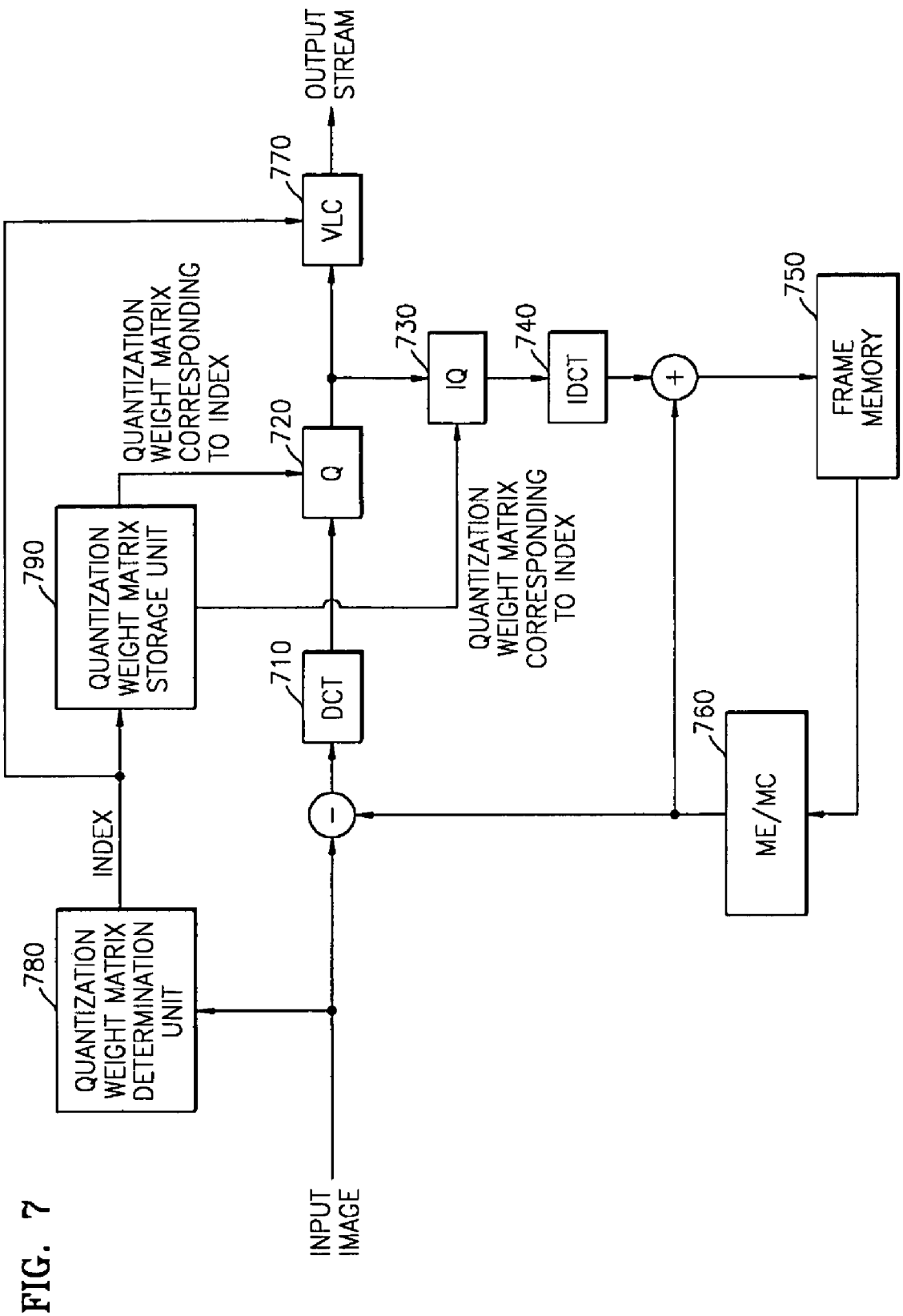
FIG. 7 is a block diagram of an apparatus for encoding moving pictures according to an embodiment of the present invention.

FIG. 7 is a block diagram of an apparatus for encoding moving pictures according to another preferred embodiment of the present invention that encodes an input image in consideration of the characteristics of the input image.

More specifically, among various characteristics of an input image, the edge characteristics of each macroblock of the input image are taken into consideration in the present embodiment.

Referring to FIG. 7, an apparatus for encoding moving pictures according to another preferred embodiment of the present invention includes a DCT unit 710, a quantization unit 720, a VLC unit 770, an inverse quantization unit 730, an inverse DCT unit 740, a frame memory unit 750, and a motion estimation and compensation unit 760, which correspond to the DCT unit 122, the quantization unit 124, the VLC unit 134, the inverse quantization unit 126, the inverse DCT unit 128, the frame memory 130, and the motion estimation and compensation unit 132, respectively, of the encoding unit 120 of FIG. 1. In addition, the apparatus further includes a quantization matrix determination unit 780 and a quantization matrix storage unit 790. Since the DCT unit 710, the inverse DCT unit 740, the frame memory unit 750, the motion estimation and compensation unit 760, and the VLC unit 770 serve the same functions as their respective counterparts of FIG. 1, their description will not be repeated.

The quantization matrix determination unit 780 selects an optimal quantization matrix for each macroblock in consideration of the characteristics of an input image and then transmits index information of the selected quantization matrix to the quantization matrix storage unit 790 and the VLC unit 770.

The quantization matrix determination unit 780 takes the edge characteristics of each macroblock into consideration as a benchmark for selecting one out of a predetermined number of quantization matrices.

Hereinafter, a method of selecting a quantization matrix in consideration of the edge characteristics of a macro block will be described in detail.

In a case where a predetermined macroblock of an input image is an intra block, the size and direction of an edge in each pixel of the predetermined macroblock are computed using such an edge detector as a sobel operator. The sobel operation can be represented by Equation (12).

$$H_1 = \begin{bmatrix} -1 & 0 & 1 \\ -2 & 0 & 2 \\ -1 & 0 & 1 \end{bmatrix}, \tag{12}$$

$$H_2 = \begin{bmatrix} -1 & -2 & -1 \\ 0 & 0 & 2 \\ 1 & 2 & 1 \end{bmatrix}$$

The quantization matrix determination unit 780 calculates the magnitude of a vertical edge and the magnitude of a horizontal edge using Equation (12) above and calculates the intensity and direction of an edge of the predetermined macroblock using the magnitude of the vertical and horizontal edges. Thereafter, the quantization matrix determination unit 780 selects one from among a predetermined number of quantization matrices in consideration of the intensity and direction of the edge of the predetermined macroblock and encoding efficiency. In other words, in a case where the predetermined macro block includes a horizontal or vertical edge, the quantization matrix determination unit 780 selects a quantization matrix that can enable quantization in full consideration of the horizontal or vertical edge of the predetermined macro block.

In a case where the predetermined macroblock is an inter block, the intensity and direction of an edge included in the predetermined macroblock can also be obtained using such an edge detector as a sobel operator.

In the present embodiment, a sobel detector is used for computing the intensity and direction of an edge included in the predetermined macroblock. However, a spatial filter, such as a differential filter or a Robert's filter, can also be used for computing the intensity and direction of the edge included in the predetermined macroblock.

In addition, in the present embodiment, a quantization matrix is selected in consideration of the edge characteristics of the predetermined macroblock. However, other characteristics of the predetermined macroblock that can affect encoding efficiency or the quality of an output image can be taken into consideration in adaptively selecting an optimal quantization matrix for the predetermined macroblock.

The quantization matrix storage unit 790 selects a quantization matrix based on the index information received from the quantization matrix determination unit 780 and transmits the selected quantization matrix to the quantization unit 720 and the inverse quantization unit 730.

The quantization unit 720 carries out quantization using the quantization matrix received from the quantization matrix storage unit 790.

The inverse quantization unit 730 carries out inverse quantization using the quantization matrix received from the quantization matrix storage unit 790.

The VLC unit 770 carries out VLC on quantized input image data, received from the quantization unit 720, and index information of a quantization matrix corresponding to the predetermined macroblock, received from the quantization weight matrix determination unit 780. The index information is inserted into a macroblock header.

In the present embodiment, index information of a quantization weight matrix corresponding to a predetermined macroblock is inserted into a header of the predetermined macroblock and then transmitted. A difference between an index value of one macroblock and an index value of an adjacent macroblock may be used as index information.

In the present embodiment, a plurality of quantization weight matrices stored in the quantization matrix storage unit 790 are also stored in a decoding unit. However, it may also be possible to use a plurality of quantization weight matrices transmitted to the decoding unit on a picture-by-picture basis using a picture extension header or transmitted to the decoding unit on a sequence-by-sequence basis using a sequence extension header.

FIG. 8 is a block diagram of an apparatus for decoding moving pictures according to an embodiment of the present invention. Referring to FIG. 8, the apparatus includes a variable length decoding unit 810, an inverse quantization unit 820, an inverse DCT unit 830, a frame memory unit 840, and a motion compensation unit 850, which correspond to the variable length decoding unit 142, the inverse quantization unit 144, the inverse DCT unit 146, the frame memory unit 148, and the motion compensation unit 150, respectively, of the decoding unit 140 of FIG. 1. In addition, the apparatus further includes a quantization weight matrix storage unit 860. The inverse DCT unit 830, the frame memory unit 840, and the motion compensation unit 850 serve the same functions as their respective counterparts of FIG. 1, and thus their description will not be repeated here.

The variable length decoding unit 810 carries out variable length decoding on an input stream, extracts index information of a quantization weight matrix corresponding to a predetermined macroblock of the input stream from a header of the predetermined macroblock, and outputs the extracted index information to the quantization weight matrix storage unit 860.

The quantization weight matrix storage unit 860 outputs a quantization weight matrix corresponding to the index information received from the variable length decoding unit 810 to the inverse quantization unit 820. The quantization weight matrix storage unit 860 stores a plurality of quantization weight matrices, which are classified according to the characteristics of an input image processed by an encoding unit, for example, a noise variance value as a ratio between an input image variance value and the edge characteristics of the input image.

The plurality of quantization weight matrices stored in the quantization weight matrix storage unit 860 can be transmitted on a picture-by-picture basis using a picture extension header or transmitted to the decoding unit on a sequence-by-sequence basis using a sequence extension header. The plurality of quantization weight matrices are transmitted from the variable length decoding unit 810 to the quantization weight matrix storage unit 860, as marked by a dotted line in FIG. 8.

The present invention can be applied to different types of methods and apparatuses for encoding and/or decoding moving pictures, such as MPEG-1, MPEG-2, or MPEG-4. In addition, the present invention can be realized as computer-readable codes written on a computer-readable recording medium. The computer-readable recording medium includes any type of recording device on which data can be written in a computer-readable manner. For example, the computer-readable recording medium includes ROM, RAM, CD-ROM, a magnetic tape, a hard disk, a floppy disk, flash memory, an optical data storage, and a carrier wave (such as data transmission through the Internet). In addition, the computer-readable recording medium can be distributed over a plurality of computer systems which are connected to one another in a network sort of way so that computer-readable codes are stored on the computer-readable recording medium in a decentralized manner.

As described above, the methods of encoding and/or decoding moving pictures according to the embodiments of present invention, a quantization matrix is adaptively applied to each macroblock of an input image in consideration of the characteristics of the input image. Thus, it is possible to enhance the efficiency and performance of encoding the input image.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of decoding moving pictures by adaptively applying a plurality of quantization weight matrices, that are not related by a scalar, to a respective macroblock of an input image, the method comprising:

receiving an encoded stream including the input image, the encoded stream comprising at least one macroblock;

for each macroblock that is an intra-block, the respective intra-block comprises information that specifies a plurality of quantization weight matrices for a luminance (Y) component of intra-blocks corresponding to the respective intra-block, wherein the specified quantization weight matrices for intra-blocks correspond to which of non-zero spatial characteristics were detected regarding the respective intra-block;

for each macroblock that is an inter-block, the respective inter-block comprises information that specifies a plurality of quantization weight matrices for a Y component of inter-blocks corresponding to the respective inter-block, wherein the specified quantization weight matrices for inter-blocks correspond to which of non-zero spatial characteristics were detected regarding the respective inter-block;

performing a variable length decoding on the encoded image data; and inversely quantizing each variable length decoded macroblock by adaptively applying specified respective quantization weight matrices for the respective macroblock, wherein at least two intra-block macroblocks of the input image having different determined spatial characteristics are inverse quantized using different intra-block quantization weight matrices, and at least two inter-block macroblocks of the input image having different determined spatial characteristics are inverse quantized using different inter-block quantization weight matrices.

2. The method of claim 1, wherein the intra-block comprised information and the inter-block comprised information are differences between an index of a quantization weight matrix corresponding to a macroblock and an index of a quantization weight matrix corresponding to an adjacent macroblock.

3. The method of claim 1, wherein each different non-zero detected spatial characteristic corresponds to different detected magnitudes of an edge included in the input image.

4. An apparatus, including at least one processing device, for decoding moving pictures by adaptively applying a plurality of quantization weight matrices applied to a macroblock, the apparatus comprising:

a variable length decoding unit to receive an encoded image stream including an image and to perform variable length decoding on the encoded image stream, the encoded image stream comprising at least one macroblock;

a quantization weight matrix storage unit to store a plurality of quantization weight matrices, to select at least one of the plurality of quantization weight matrices, and to output at least the selected quantization weight matrix; and an inverse quantization unit to inversely quantize each macroblock of the variable-length-decoded image stream using at least the output selected quantization weight matrix, wherein for each macroblock that is an intra-block, a respective intra-block macroblock comprises information that specifies which of the plurality of quantization weight matrices, predefined for a luminance (Y) component of intra-blocks, corresponds to a selected quantization weight matrix used in quantizing the Y component of the respective intra-block macroblock, and for each macroblock that is an inter-block, a respective inter-block macroblock comprises information that specifies which of the plurality of quantization weight matrices, predefined for a Y component of inter-blocks, corresponds to a selected quantization weight matrix used in quantizing the Y component of the respective inter-block macroblock, and wherein the quantization weight matrix storage unit selects one of the plurality of quantization weight matrices based on the respective intra-block macroblock comprised information or the inter-block macroblock comprised information, with the specified quantization weight matrices predefined for intra-blocks corresponding at least to which of different non-zero spatial characteristics were detected in the input image or in the input image at least regarding the respective intra-block macroblock, and the specified quantization weight matrices predefined for inter-blocks corresponding to at least to which of different non-zero spatial characteristics were detected in the input image or in the image at least regarding the respective inter-block macroblock, wherein at least two intra-block macroblocks of the input image having different determined spatial characteristics are inverse quantized using different intra-block quantization weight matrices, and at least two inter-block macroblocks of the input image having different determined spatial characteristics are inverse quantized using different inter-block quantization weight matrices.

5. The apparatus of claim 4, wherein the intra-block macroblock comprised information and the inter-block macroblock comprised information are differences between an index of a quantization weight matrix corresponding to a macroblock and an index of a quantization weight matrix corresponding to an adjacent macroblock.

6. The apparatus of claim 4, wherein each different non-zero detected spatial characteristic corresponds to different detected magnitudes of an edge included in the image.

7. The apparatus of claim 4, wherein, for intra-blocks, each different non-zero detected spatial characteristic is detected in the respective intra-block macroblock and corresponds to different detected magnitudes of an edge included in the respective intra-block macroblock, and, for inter-blocks, each different non-zero detected spatial characteristic is detected in the respective inter-block macroblock and corresponds to different detected magnitudes of an edge included in the respective inter-block macroblock.

8. A method of decoding moving pictures by adaptively applying a plurality of quantization weight matrices, that are not related by a scalar, to a respective macroblock of an input image, the method comprising:

receiving an encoded stream including the input image, the encoded stream comprising at least one macroblock;

for each macroblock that is an intra-block, a respective intra-block macroblock comprises information that specifies which of the plurality of quantization weight matrices, predefined for a luminance (Y) component of intra-blocks, corresponds to a selected quantization weight matrix used in quantizing the Y component of the respective intra-block macroblock based on at least which of different non-zero spatial characteristics were detected in the input image or in the input image at least regarding the respective intra-block macroblock;

for each macroblock that is an inter-block, a respective inter-block macroblock comprises information that specifies which of the plurality of quantization weight matrices, predefined for a Y component of inter-blocks, corresponds to a selected quantization weight matrix used in quantizing the Y component of the respective inter-block macroblock based on at least which of different non-zero spatial characteristics were detected in the input image or in the input image at least regarding the respective inter-block macroblock;

performing a variable length decoding on the encoded image data; and inversely quantizing each variable length decoded macroblock by adaptively applying the specified respective quantization weight matrices for the respective macroblock, wherein at least two intra-block macroblocks of the input image having different determined spatial characteristics are inverse quantized using different intra-block quantization weight matrices, and at least two inter-block macroblocks of the input image having different determined spatial characteristics are inverse quantized using different inter-block quantization weight matrices.

9. The method of claim 8, wherein the intra-block macroblock comprised information and the inter-block macroblock comprised information are differences between an index of a quantization weight matrix corresponding to a macroblock and an index of a quantization weight matrix corresponding to an adjacent macroblock.

10. The method of claim 8, wherein each different non-zero detected spatial characteristic corresponds to different detected magnitudes of an edge included in the input image.

11. The method of claim 10, wherein, for intra-blocks, each different non-zero detected spatial characteristic is detected in the respective intra-block macroblock and corresponds to different detected magnitudes of an edge included in the respective intra-block macroblock, and, for inter-blocks, each different non-zero detected spatial characteristic is detected in the respective inter-block macroblock and corresponds to different detected magnitudes of an edge included in the respective inter-block macroblock.

12. An apparatus, including at least one processing device, to decode a bit stream including an image by adaptively applying a plurality of stored quantization weight matrices, that are not related by a scalar, to respective macroblocks extracted from the bit stream, the apparatus comprising:

a memory device storing the plurality of quantization weight matrices; and an inverse quantizer configured to inversely quantize respective intra-block macroblocks of the bit stream and respective inter-block macroblocks of the bit stream using respectively selected quantization weight matrices for a luminance (Y) component predefined for the respective intra-block macroblocks and selected quantization weight matrices for a Y component predefined for the respective inter-block macroblocks, wherein the selected quantization weight matrices for the Y component for the respective intra-block macroblocks and the selected quantization weight matrices for the Y component for the respective inter-block macroblocks are selected from the plurality of stored quantization weight matrices based upon index information encoded in the bit stream identifying which of the plurality of quantization weight matrices to select and obtain from the memory device for the inverse quantizing by the inverse quantizer, with each of the index information encoded in the bit stream being based upon which of different non-zero spatial characteristics were detected in the image or in the input image at least regarding the respective macroblocks, wherein at least two intra-block macroblocks of the input image having different determined spatial characteristics are inverse quantized using different intra-block quantization weight matrices, and at least two inter-block macroblocks of the input image having different determined spatial characteristics are inverse quantized using different inter-block quantization weight matrices.

13. The apparatus of claim 12, wherein each non-zero detected spatial characteristic corresponds to different detected magnitudes of an edge included in the image.

14. The apparatus of claim 13, wherein each different non-zero detected spatial characteristic is detected in each of the respective macroblocks.

15. A method decoding a bit stream by adaptively applying a plurality of stored quantization weight matrices, that are not related by a scalar, to respective macroblocks extracted from the bit stream including an image, the apparatus comprising:

storing the plurality of quantization weight matrices in a memory device;

selecting respective quantization weight matrices for a luminance (Y) component predefined for respective intra-block macroblocks of the respective macroblocks and respective quantization weight matrices for a Y component predefined for respective inter-block macroblocks of the respective macroblocks, from the plurality of stored quantization weight matrices, based upon index information encoded in the bit stream identifying which of the plurality of quantization weight matrices to select and obtain from the memory device for inverse quantization, with each of the index information encoded in the bit stream being based upon respective different non-zero detected spatial characteristics detected in the input image or in the input image at least regarding the respective macroblocks; and inversely quantizing the respective intra-block macroblocks using the selected respective quantization weight matrices for the Y component for the respective intra-block macroblocks and inversely quantizing the respective inter-block macroblocks using the selected respective quantization weight matrices for the Y component for the respective inter-block macroblocks, wherein at least two intra-block macroblocks of the input image having different determined spatial characteristics are inverse quantized using different intra-block quantization weight matrices, and at least two inter-block macroblocks of the input image having different determined spatial characteristics are inverse quantized using different inter-block quantization weight matrices.

16. The method of claim 15, wherein each non-zero detected spatial characteristic corresponds to different detected magnitudes of an edge included in the image.

17. The method of claim 16, wherein each different non-zero detected spatial characteristic is detected in each of the respective macroblocks.

* * * * *